March 10, 1964

J. R. SOLUM ETAL 3,124,199

SPIRAL OIL WELL CEMENTING TOOL

Filed July 14, 1961

INVENTORS.
JAMES R. SOLUM
WILLIAM C. HEMPEL

BY

ATTORNEYS.

March 10, 1964 J. R. SOLUM ETAL 3,124,199
SPIRAL OIL WELL CEMENTING TOOL
Filed July 14, 1961 2 Sheets-Sheet 2
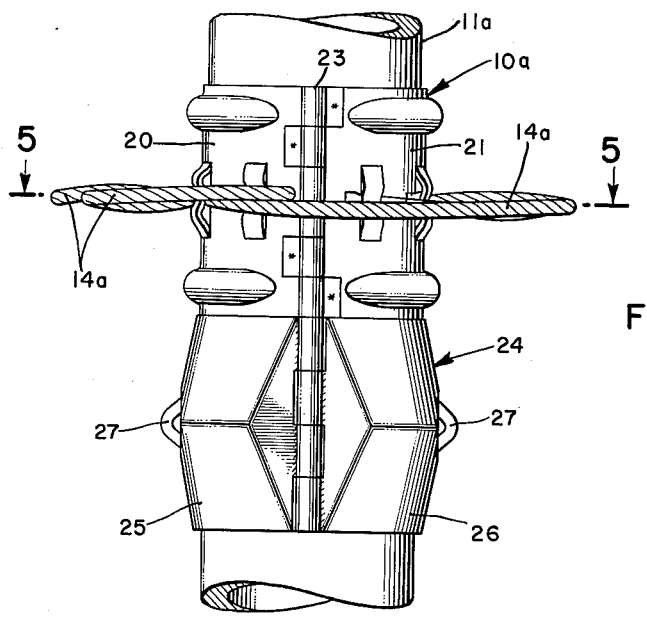
FIG. 4.
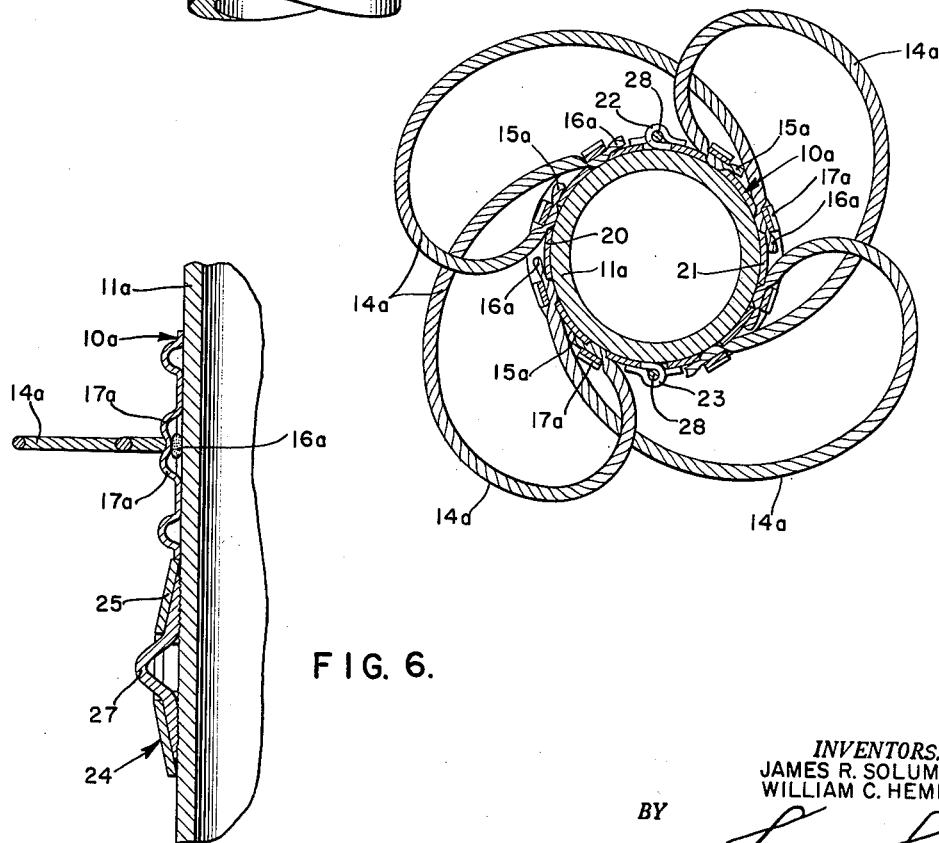
FIG. 5.
FIG. 6.
INVENTORS.
JAMES R. SOLUM
WILLIAM C. HEMPEL
BY
*Lyon & Lyon*
ATTORNEYS.

United States Patent Office

3,124,199
Patented Mar. 10, 1964

3,124,199
SPIRAL OIL WELL CEMENTING TOOL
James R. Solum, Los Angeles, and William C. Hempel, Manhattan Beach, Calif., assignors to B & W Incorporated, Torrance, Calif., a corporation of California
Filed July 14, 1961, Ser. No. 124,040
7 Claims. (Cl. 166—173)

This invention relates to a tool for use in the cementing of oil wells and, in particular, is directed to a device adapted to be mounted on the exterior of a well casing for cleaning the well bore wall and agitating the drilling fluid within the annular space between the casing and the well bore.

In the drilling and completion of oil and gas wells, it is common practice to cement the casing within the well bore preparatory to drilling the well deeper or perforating the casing for completion of the well. The well bore is filled with drilling fluid or mud when the casing to be cemented is lowered into the well bore. When the casing is in the desired position, the cement is pumped down through the casing out through the bottom or some intermediate point along the casing and upward through the annular space between the exterior of the casing and the well bore until the desired amount of cement is placed in the annular space.

It has been generally found that it is advantageous to install certain apparatus on the exterior of the casing commonly known as "scratchers" to improve the quality of cement bond between the casing and the well bore. The scratchers are usually considered to perform at least two functions in the cementing operations. First, to abrade the well bore wall and remove any filter cake deposited thereon and, second, to agitate the drilling fluid or mud in the annular space to change it from a gelled to a fluid condition so that the mud may be more readily and completely displaced by the cement as it is pumped upwardly in the annular space. The abrading of the well bore wall serves to promote better adhesion of the cement to the wall.

In some well conditions, it may be objectionable to extensively abrade the well bore wall to remove the filter cake. For example, it has been found that when the well bore is through relatively loose strata, such as near the surface, extensive abrading in that area causes the well bore walls to cave in and contaminate the cement. However, even under these conditions, it is desirable to agitate the drilling fluid in the annulus as well as removing some of the filter cake from the well bore.

Scratchers commonly effect the abrading and agitation by either rotation or reciprocation of the casing depending upon the type of scratcher mounted on the casing. Accordingly, it is advantageous for the scratcher to contact the well bore wall relatively uniformly and completely adjacent the scratchers so that the rotation or reciprocation serves to uniformly and completely abrade or wipe the well bore wall.

Accordingly, it is a principal object of this invention to provide an improved form of oil well cementing tool of the type adapted to be mounted on the exterior of the casing for agitating the drilling mud or fluid and removing some of the filter cake adhering to the well bore walls.

Another object of this invention is to provide an oil well cementing tool for mounting on the exterior of the casing to agitate the drilling fluid in the annular space between the well bore wall and the casing, and wherein flexible members have relatively uniform surface contact with the well bore wall for wiping the excess filter cake off the wall.

A further and more detailed object of this invention is to provide an oil well cementing tool for mounting on the exterior of the casing wherein multiple strand flexible cables are formed in generally spiral shaped loops for effecting substantial and uniform contact with the well bore wall for wiping the excess filter cake from the well bore wall.

Other and more detailed objects and advantages of this invention will appear from the following description in the accompanying drawings:

In the drawings:

FIGURE 4 is an elevation view illustrating a modified form of this invention installed on a fragmentary length of casing.

FIGURE 5 is a sectional plan view taken substantially on the line 5—5 of FIGURE 4.

FIGURE 6 is a sectional elevation view similar to FIGURE 3 showing the modified form of this invention illustrated in FIGURE 4.

Figure 1:
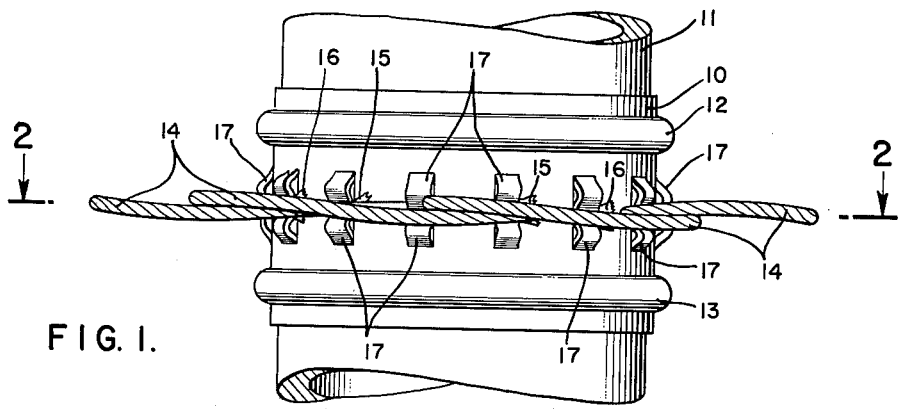
FIGURE 1 is an elevation view showing the device of this invention installed on a fragmentary portion of the casing.

Referring now to the drawings, a carrier or sleeve 10 has an internal cylindrical surface adapted to be slipped over the casing 11 and mounted thereon by any convenient means. The sleeve 10 is provided with a pair of circumferential beaded portions 12 and 13 for added strength and rigidity of the sleeve.

A plurality of flexible members 14 are provided and mounted on the sleeve 10, as hereinafter described. Although it is not essential, we prefer to use multiple strand flexible cable for the flexible members 14 so that each member has a certain degree of rigidity and yet is sufficiently flexible as to avoid gouging or undue abrading of the well bore wall. Each flexible member 14 therefore is comprised of a length of multiple strand cable having ends 15 and 16 for mounting on the sleeve 10.

The sleeve 10 is provided with a plurality of bridge elements 17 circumferentially spaced around the sleeve. We prefer to construct the bridge element 17 integrally with the sleeve 10 by lancing a strip of metal outwardly from the sleeve 10 along two substantially parallel and axially extending edges. The lanced out portion therefore forms a circumferentially directed opening 18 for insertion of the cable ends 15 and 16 under the bridge elements 17. Any one of numerous other ways could be used to mount the cable ends so that they are positioned in a generally circumferential direction, but we prefer the integral bridge element for economy and ease of manufacturing.

Figure 2:
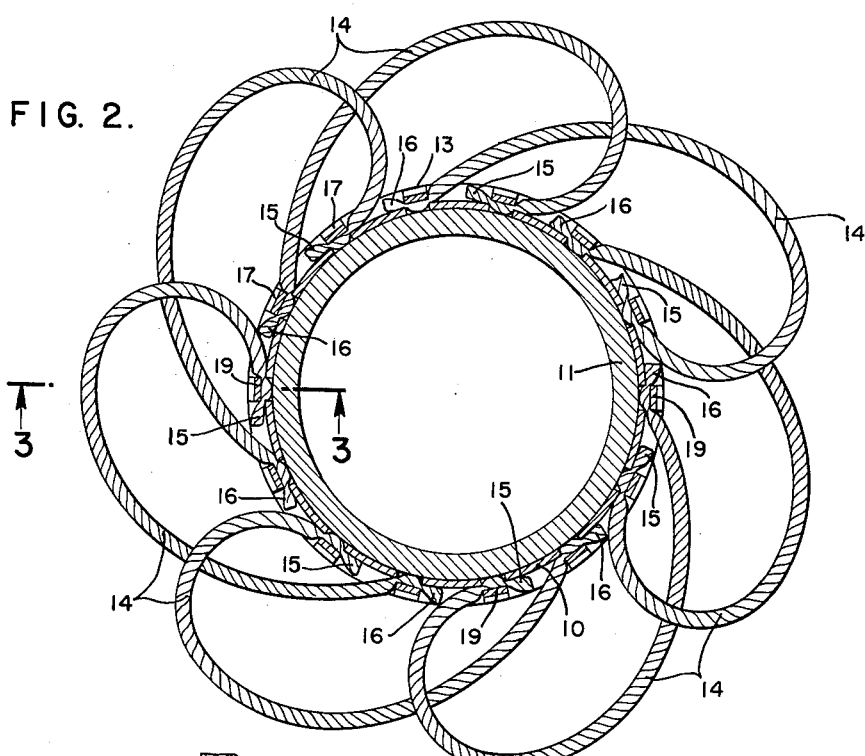
FIGURE 2 is a sectional plan view taken substantially on the line 2—2 of FIGURE 1.
Figure 3:
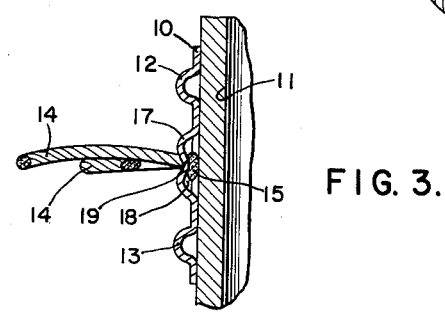
FIGURE 3 is a sectional elevation view taken substantially on the line 3—3 of FIGURE 2.

Each of the cable ends 15 and 16 are inserted through the opening 18 in the bridge element in the same circumferential direction as best shown in FIGURE 2. The major portion of the flexible member 14 therefore assumes a generally spiral configuration for achieving the objective of obtaining a construction where each flexible member will have surface contact with a considerable segment of the well bore. The ends 15 and 16 of each loop are mounted in circumferentially spaced bridge elements 17 with two bridge elements 17 between the ends of each loop so that the ends 15 and 16 of the next adjacent loops on either side are mounted within that loop. By this physical arrangement, each loop overlaps the next adjacent loop on either side so that there is, in effect, a mutual support and co-action among all the loops. Further, this overlapping relationship accomplishes a more uniform and complete surface contact by the loops with the well bore wall.

The ends 15 and 16 of the cable member 14 are retained within the bridge element 17 by physically forcing the mid portion 19 of the bridge element radially inward to mash the cable end between the outer surface of the sleeve 10 and the inner surface of the bridge element 17. By positioning the cable end portions in substantially a circumferential direction, the loops are equally flexible in either an upward or downward direction so that the device of this invention functions equally well on the up and down strokes of reciprocation of the casing. Further, the sleeve 10 may be attached securely to the casing 11 rather than be free to move thereon as is required with many common types of scratchers in order to avoid premature wearing of the scratcher before the casing reaches the desired position in the well bore.

In the modified form of our invention shown in FIGURES 4, 5 and 6, the sleeve 10a is comprised of two semi-cylindrical half-sleeves 20 and 21, hinged at diametrically positioned hinge elements 22 and 23. The flexible members 14a are substantially the same and have end portions 15a and 16a mounted in similar bridge elements 17a circumferentially spaced on the half-sleeves 20 and 21. Further, the modified form is illustrated as being attached to conventional stop member, generally designated 24, for securing the assembly to the casing or pipe 11a. Stop member 24 is also comprised of two half collars 25 and 26 with hinge elements aligned with the hinge elements 22 and 23 of the sleeve 10a. The stop collar 24 has internal tapered surfaces and an opening for positioning a wedge element 27 therein so that radial force in an inward direction on the wedge element forces the wedge portions thereof axially along the pipe to secure the stop collar 24 to the casing or pipe 11a.

One of the hinge pins 28 of either of the hinge elements 22 and 23 may be removed for opening of the half collars 20 and 21 together with half collars 25 and 26 for ease of installation on the casing 11a. After the assembly is positioned on the casing, the hinge pin 28 may be reinserted in the appropriate hinge element so that the wedge elements 27 may be actuated to secure the assembly in that position. It may readily be seen from FIGURE 5 that with one of the hinge pins 28 removed, the half collars may be opened a certain amount, but that the flexible member 14a which extends from one half collar 20 to the other half collar 21 prevents complete opening of the half collars for lateral application of the assembly to the casing or pipe 11a. This hinging is provided essentially for permitting installation of the device on externally upset pipe which, as is well known in the art, has a larger external diameter adjacent its ends than the external diameter of the major portion of the pipe. With the assembly hinged open a certain amount of it may be slipped over the upset end of the pipe onto the major portion, closed wtih a hinge pin 28, and installed as described.

Having fully described our invention, it is to be understood that we do not wish to be limited to the details herein set forth or to the details illustrated in the drawings, but our invention is of the full scope of the appended claims.

We claim:

1. In a device for use on a well casing for causing turbulence of the fluid in the annular space between the casing and the well bore, the combination of: a carrier having a plurality of spaced mounting means, a plurality of cable lengths with each cable length having one end mounted in one of said mounting means and the other end mounted in a separate and spaced mounting means, each said cable length forming a loop for projecting into the annular space, each of said loops lying substantially in a plane passing through the said plurality of mounting means, and the said cable length ends each positioned in said mounting means in the same direction and pointed toward the next adjacent mounting means in that direction for forming each said loop into a generally spiral configuration.

2. In a device for use on a well casing for causing turbulence of the fluid in the annular space between the casing and the well bore, the combination of: a sleeve having a plurality of circumferentially spaced mounting means, a plurality of cable lengths with each cable length having one end mounted in one of said mounting means and the other end mounted in a separate and spaced mounting means, each said cable length forming a loop for projecting into the annular space, each of said loops lying substantially in a plane perpendicular to the axis of said sleeve, and the said cable length ends each positioned in said mounting means in the same circumferential direction and pointed toward the next adjacent mounting means in that circumferential direction for forming each said loop into a generally spiral configuration.

3. In a device for use on a wall casing for causing turbulence of the fluid in the annular space between the casing and the well bore, the combination of: a sleeve having a plurality of circumferentially spaced mounting means, each mounting means having a circumferentially directed opening, a plurality of cable lengths with each cable length having one end mounted in an opening in one of said mounting means and the other end mounted in an opening in a separate and spaced mounting means, each said cable length forming a loop for projecting into the annular space, each of said loops lying substantially in a plane perpendicular to the axis of said sleeve and passing through the said plurality of mounting means, and the said cable length ends each positioned in said mounting means in the same circumferential direction and pointed toward the next adjacent mounting means in that circumferential direction for forming each said loop into a generally spiral configuration.

4. In a device for use on a well casing for causing turbulence of the fluid in the annular space between the casing and the well bore, the combination of: a carrier having a plurality of spaced mounting means, a plurality of elongated flexible members with each member having one end mounted in one of said mounting means and the other end mounted in a separate and spaced mounting means, each of said members forming a loop for projecting into the annular space, each of said loops lying substantially in a plane passing through the said plurality of mounting means, and the said ends of said members each positioned in said mounting means in the same direction and pointed toward the next adjacent mounting means in that direction for forming each said loop into a generally spiral configuration.

5. In a device for use on a well casing for causing turbulence of the fluid in the annular space between the casing and the well bore, the combination of: a cylindrical sleeve adapted to encircle the well casing, a plurality of axially extending bridge elements circumferentially spaced on said sleeve, each bridge element having a circumferentially directed opening, a plurality of cable lengths each having a pair of ends, each said end extending into a separate one of said openings for mounting said ends in said bridge elements, each said bridge element compressed radially for retaining said cable ends therein, each cable length forming a radially projecting loop, and each cable end extending in the same circumferential direction on said sleeve and pointed toward the next adjacent bridge element in that circumferential direction for forming each said loop into a spiral.

6. In a device for use on a well casing for causing turbulence of the fluid in the annular space between the casing and the well bore, the combination of: a cylindrical sleeve adapted to encircle the well casing, a plurality of axially extending bridge elements circumferentially spaced on said sleeve, each bridge element having a circumferentially directed opening, a plurality of cable lengths each having a pair of ends, each said end extending into a separate one of said openings for mounting said ends in said bridge elements, each said bridge element compressed radially for retaining said cable ends therein, each cable length forming a radially projecting loop, each cable end extending in the same circumferential direction on said sleeve and pointed toward the next adjacent bridge element in that circumferential direction for forming each said loop into a spiral, and each loop in overlapping relation with the next adjacent loop.

7. In a device for use on a well casing for causing turbulence of the fluid in the annular space between the casing and the well bore, the combination of: a cylindrical sleeve adapted to encircle the well casing, said sleeve being comprised of two semi-cylindrical half-collars having mating hinge elements, hinge pins joining said half-collars at said hinge elements, a plurality of axially extending bridge elements circumferentially spaced on said sleeve, each bridge element having a circumferentially directed opening, a plurality of cable lengths each having a pair of ends, each said end extending into a separate one of said openings for mounting said ends in said bridge elements, each said bridge element compressed radially for retaining said cable ends therein, each cable length forming a radially projecting loop, each cable end extending in the same circumferential direction on said sleeve and pointed toward the next adjacent bridge element in that circumferential direction for forming each said loop into a spiral, and each loop in overlapping relation with the next adjacent loop.

References Cited in the file of this patent

UNITED STATES PATENTS

| | | |
|---|---|---|
| 2,826,253 | Wright et al. | May 11, 1958 |
| 2,881,840 | Wright et al. | Apr. 14, 1959 |
| 2,918,974 | Johnson | Dec. 29, 1959 |